(12) United States Patent
Cole-Yocom et al.

(10) Patent No.: US 11,498,033 B2
(45) Date of Patent: Nov. 15, 2022

(54) CHEMICAL LIQUID MANUFACTURING APPARATUS AND MANUFACTURING METHOD OF CHEMICAL LIQUID

(71) Applicant: FUJIFILM Electronic Materials U.S.A., Inc., North Kingstown, RI (US)

(72) Inventors: Marcia Cole-Yocom, Scottsdale, AZ (US); Bryan Hinzie, Gilbert, AZ (US); Yuan Chen, Chandler, AZ (US); Jack W. Helzer, Chandler, AZ (US); Pejman Ahmadiannamini, Gilbert, AZ (US)

(73) Assignee: FUJIFILM Electronic Materials U.S.A., Inc., North Kingstown, RI (US)

( * ) Notice: Subject to any disclaimer, the term of this patent is extended or adjusted under 35 U.S.C. 154(b) by 34 days.

(21) Appl. No.: 16/690,133

(22) Filed: Nov. 21, 2019

(65) Prior Publication Data

US 2020/0156013 A1 May 21, 2020

Related U.S. Application Data

(60) Provisional application No. 62/770,722, filed on Nov. 21, 2018.

(51) Int. Cl.
*B01D 69/02* (2006.01)
*B01D 71/56* (2006.01)
(Continued)

(52) U.S. Cl.
CPC ............. *B01D 69/02* (2013.01); *B01D 71/56* (2013.01); *B01D 71/64* (2013.01); *C08J 5/2256* (2013.01);
(Continued)

(58) Field of Classification Search
CPC .... B01D 39/08; B01D 39/083; B01D 39/086; B01D 39/14; B01D 39/16; B01D 39/1607;
(Continued)

(56) References Cited

U.S. PATENT DOCUMENTS

2006/0231406 A1   10/2006   Freydina et al.
2014/0163264 A1*  6/2014    Takahashi ............... C07C 29/76
                                                              568/916
(Continued)

FOREIGN PATENT DOCUMENTS

AU           669819      6/1996
CN          105457335    4/2016
(Continued)

OTHER PUBLICATIONS

"International Search Report (Form PCT/ISA/210) of PCT/US2019/62515," dated Feb. 3, 2020, pp. 1-2.
(Continued)

*Primary Examiner* — Allison G Fitzsimmons
(74) *Attorney, Agent, or Firm* — JCIP Global Inc.

(57) ABSTRACT

A chemical liquid manufacturing apparatus is provided. The manufacturing apparatus at least includes an ion exchange medium and an ion adsorption medium configured downstream from the ion exchange medium. A material of the ion
(Continued)

adsorption medium includes a resin material having an amide bond or an imide bond. A manufacturing method of a chemical liquid using the apparatus is also provided.

7 Claims, 2 Drawing Sheets

(51) Int. Cl.
   *B01D 71/64* (2006.01)
   *C08J 5/22* (2006.01)
   *D04H 1/60* (2006.01)
(52) U.S. Cl.
   CPC ...... *B01D 2325/02* (2013.01); *B01D 2325/12* (2013.01); *B01D 2325/42* (2013.01)
(58) Field of Classification Search
   CPC ............ B01D 39/1638; B01D 39/1653; B01D 39/1661; B01D 39/1692; B01D 39/18; B01D 39/20; B01D 39/2055; B01D 39/2058; B01D 39/2072; B01D 61/14; B01D 61/142; B01D 61/145; B01D 61/147; B01D 61/18; B01D 61/58; B01D 63/00; B01D 63/02; B01D 63/08; B01D 69/00; B01D 69/02; B01D 69/04; B01D 69/06; B01D 69/08; B01D 71/00; B01D 71/02; B01D 71/021; B01D 71/024; B01D 71/028; B01D 71/06; B01D 71/56; B01D 2215/00; B01D 2319/02; B01D 2319/025; B01D 2319/06; B01D 2325/02; B01D 2325/12; B01D 2325/14; B01D 2325/16; B01D 2325/18; B01D 2325/20; B01D 2325/42

See application file for complete search history.

(56) References Cited

U.S. PATENT DOCUMENTS

| | | |
|---|---|---|
| 2016/0159112 A1 | 6/2016 | Bamba et al. |
| 2016/0256836 A1 | 9/2016 | Bonyadi |
| 2017/0298091 A1 | 10/2017 | Stone et al. |
| 2018/0028983 A1* | 2/2018 | Takashima ............. B01D 71/64 |
| 2019/0258168 A1 | 8/2019 | Kamimura et al. |

FOREIGN PATENT DOCUMENTS

| | | |
|---|---|---|
| JP | 2003112060 | 4/2003 |
| WO | 2018051716 | 3/2018 |
| WO | 2018084302 | 5/2018 |
| WO | 2019191520 | 10/2019 |
| WO | 2020106567 | 5/2020 |

OTHER PUBLICATIONS

"Written Opinion of the International Searching Authority (Form PCT/ISA/237) of PCT/US2019/62515," dated Feb. 3, 2020, pp. 1-4.

* cited by examiner

CHEMICAL LIQUID MANUFACTURING APPARATUS AND MANUFACTURING METHOD OF CHEMICAL LIQUID

CROSS-REFERENCE TO RELATED APPLICATION

This application claims the priority benefit of U.S. provisional application Ser. No. 62/770,722, filed on Nov. 21, 2018. The entirety of the above-mentioned patent application is hereby incorporated by reference herein and made a part of this specification.

BACKGROUND

1. Related Field

The present disclosure relates to a chemical liquid manufacturing apparatus and a manufacturing method of a chemical liquid using the same.

2. Description of the Related Art

The semiconductor industry has achieved rapid improvements in integration density of electronic components, which are derived from continuous reductions in the component size. Ultimately, more of the smaller components are afforded to be integrated into a given area. These improvements are mostly due to the development of new precision and high resolution processing techniques.

During the manufacturing of high resolution integrated circuits, various processing liquids will come into contact with a bare wafer or a film-coated wafer. For example, the fabrication of a fine metal interconnection typically involves a procedure of coating a base material with a pre-wetting liquid before the base material is coated with a composite liquid to form a resist film. These processing liquids, containing propriety ingredients and various additives, are known to be a source of contamination of IC wafer.

One can speculate that even if a trace amount of contaminants is mixed into these chemical liquids, such as a wafer pre-wetting liquid, a developer solution or rinse solution, the resulting circuit patterns may have defects. It is known that the presence of very low levels of metal impurities, as low as 1.0 ppt, interferes with the performance and stability of semiconductor devices. And depending on the kind of metallic contaminants, oxide property may deteriorate, inaccurate patterns are formed, electrical performance of semiconductor circuits is impaired, which eventually adversely impact manufacturing yields.

The contamination of impurities, such as metal impurities, coarse particles, organic impurities, moisture, and the like, may be inadvertently introduced in a chemical liquid during various stages of the manufacturing of the chemical liquid. Examples of such include a case where impurities are presented in a raw material, or originated from a container equipment, reaction vessels, or the like used in transporting, storing, or reaction of the raw material or the chemical liquid, or a by-product generated or an unreacted reactant remained when the chemical liquid is manufactured.

Therefore, in order to form highly precise and ultra-fine semiconductor electronic circuits, chemical liquids used in the various stages of semiconductor processing, such as pre-wetting liquid, a resist solution, a developer solution, a stripping solution, a rinsing solution, and a coating solution, etc., necessitate significant quality improvement and must maintain rigorous quality control to avoid incurring defects on the resulting circuit patterns.

SUMMARY

Accordingly, to form highly precise integrated circuits, the demands for ultra-pure chemical liquids, and the quality improvement and control of theses liquids become very critical. Specific key parameters targeted for quality improvement and control include: trace-metal reduction, liquid particle count reduction, on-wafer defect reduction, organic contaminant reduction, etc. All of these key parameters are shown to be impacted by a requisite preparation of a manufacturing apparatus and a proper design of a manufacturing process.

In view of the above, the present disclosure is to provide particularly a chemical liquid manufacturing apparatus and a manufacturing method for preparing a chemical liquid for semiconductor manufacturing, wherein a high purity chemical liquid is produced with the number of unwanted particulates and the amount of metallic impurities in the chemical liquid managed and limited within predetermined ranges. Hence, the occurrence of residue and/or particle defects is suppressed and the yield of semiconductor wafer is improved.

In accordance with some embodiments of the present disclosure, a chemical liquid manufacturing apparatus is configured to process a material. The chemical liquid manufacturing apparatus includes an ion exchange media; and an ion adsorption media.

According to certain exemplary embodiments, the ion adsorption media is constituted with a resin material containing an amide bond, an imide bond or a combination of an amide bond and imide bond.

In accordance with some embodiments of the present disclosure, a manufacturing method of a chemical liquid includes providing a system at least including one or plural ion exchange membranes and one or plural ion adsorption membranes; delivering a material to the system; processing the material with the one or plural ion exchange membranes; and processing the material with the one or plural ion adsorption membranes to produce the chemical liquid.

According to the present disclosure, a chemical liquid manufacturing apparatus and a manufacturing method of a chemical liquid using the same are effectively designed and properly configured to enhance the removal and to obviate an introduction or generation of a wide range of organic and inorganic contaminants during the production process and to produce an ultra-high purity chemical liquid applicable in semiconductor manufacturing.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides different embodiments or examples, for implementing various features of the current subject matter. Specific examples of components and arrangements are described below to simplify the present disclosure. These are merely examples and are not intended to be limiting. For example, when the term "solvent(s)" is used, unless otherwise noted, it may refer to a single solvent or a combination of two or more solvents.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the present disclosure, a numerical range indicated by using a term "to" means a range which includes numerical values described before and after the term of "to", as a lower limit value and an upper limit value.

In the present disclosure, "ppm" means "parts-per-million (10-6)", "ppb" means "parts-per-billion (10-9)" and "ppt" means "parts-per-trillion (10-12)".

In the present disclosure, 1 Å (angstrom) corresponds to 0.1 nm (nanometer) and 1 μm (micron) corresponds to 1000 nm.

<Processing Target>

Prior to being subjected to a purification process, a chemical liquid may contain an undesirable amount of impurities and contaminants. A pre-purified chemical liquid is referred herein in the present disclosure as "processing target" or "processing target material". After the processing target is being processed by the chemical liquid manufacturing apparatus of the present disclosure, substantial amounts of contaminants and impurities are removed from the processing target, and a chemical liquid is produced with impurities and contaminants managed and limited within predetermined ranges.

<Chemical Liquid>

In the present disclosure, a chemical liquid includes an organic solvent and a predetermined amount of impurities. A chemical liquid may include a processing solution used in semiconductor manufacturing, such as a pre-wetting liquid, a developer solution, a rinsing liquid, a cleaning solution, a stripping solution and the like, and a raw component used for the synthesis of the processing solution.

<Organic Solvent>

In the present disclosure, the chemical liquid includes an organic solvent. The type of organic solvent is not particularly limited, but well-known organic solvents are applicable. The content of the organic solvent in the chemical liquid is not particularly limited, but the organic solvent is included as the main component. Specifically, the content of the organic solvent is equal to or greater than 98 mass % with respect to the total mass of the chemical liquid. In certain embodiments, the content of the organic solvent is equal to or greater than 99 mass % with respect to the total mass of the chemical liquid. In other embodiments, the content of the organic solvent is equal to or greater than 99.5 mass % with respect to the total mass of the chemical liquid. In yet other embodiments, the content of the organic solvent is equal to or greater than 99.8 mass % with respect to the total mass of the chemical liquid. The upper limit value thereof is not particularly limited, but it is in general that the upper limit value thereof is equal to or smaller than 99.999 mass %.

The organic solvent may be singly used or may be used in combination of two kinds or more thereof. In a case where a combination of two kinds or more of organic solvents is used, it is preferable that the total content thereof is in the above range.

The content of the organic solvent in the chemical liquid can be measured by using a gas chromatography mass spectrometry (GCMS) device.

The boiling point of the organic solvent is not particularly limited. However, the boiling point of the organic solvent is preferably lower than 200° C. from a point of improving manufacturing yield of a semiconductor chip. In this disclosure, the boiling point means a boiling point at 1 atm.

The organic solvent is not particularly limited. Examples of the organic solvent include methanol, ethanol, 1-propanol, isopropanol, n-propanol, 2-methyl-1-propanol, n-butanol, 2-butanol, tert-butanol, 1-pentanol, 2-pentanol, 3-pentanol, n-hexanol, cyclohexanol, 2-methyl-2-butanol, 3-methyl-2-butanol, 2-methyl-1-butanol, 3-methyl-1-butanol, 2-methyl-1-pentanol, 2-methyl-2-pentanol, 2-methyl-3-pentanol, 3-methyl-1-pentanol, 3-methyl-2-pentanol, 3-methyl-3-pentanol, 4-methyl-1-pentanol, 4-methyl-2-pentanol, 2-ethyl-1-butanol, 2,2-dimethyl-3-pentanol, 2,3-dimethyl-3-pentanol, 2,4-dimethyl-3-pentanol, 4,4-dimethyl-2-pentanol, 3-ethyl-3-heptanol, 1-heptanol, 2-heptanol, 3-heptanol, 2-methyl-2-hexanol, 2-methyl-3-hexanol, 5-methyl-1-hexanol, 5-methyl-2-hexanol, 2-ethyl-1-hexanol, methyl cyclohexanol, trimethyl cyclohexanol, 4-methyl-3-heptanol, 6-methyl-2-heptanol, 1-octanol, 2-octanol, 3-octanol, 2-propyl-1-pentanol, 2,6-dimethyl-4-heptanol, 2-nonanol, 3,7-dimethyl-3-octanol, ethylene glycol, propylene glycol, diethyl ether, dipropyl ether, diisopropyl ether, butyl methyl ether, butyl ethyl ether, butyl propyl ether, dibutyl ether, diisobutyl ether, tert-butyl methyl ether, tert-butyl ethyl ether, tert-butyl propyl ether, di-tert-butyl ether, dipentyl ether, diisoamyl ether, cyclopentyl methyl ether, cyclohexyl methyl ether, bromomethyl methyl ether, α,α-dichloromethyl methyl ether, chloromethyl ethyl ether, 2-chloroethyl methyl ether, 2-bromoethyl methyl ether, 2,2-dichloromethyl methyl ether, 2-chloroethyl ethyl ether, 2-bromoethyl ethyl ether, (±)-1,2-dichloroethyl ethyl ether, 2,2,2-trifluoroethyl ether, ethyl vinyl ether, butyl vinyl ether, allyl ethyl ether, allyl propyl ether, allyl butyl ether, diallyl ether, 2-methoxypropene, ethyl-1-propenyl ether, cis-1-bromo-2-ethoxyethylene, 2-chloroethyl vinyl ether, allyl-1,1,2,2-tetrafluoroethyl ether, octane, isooctane, nonane, decane, methylcyclohexane, decalin, xylene, ethylbenzene, diethylbenzene, cumene, second-butylbenzene, cymene, dipentene, methyl pyruvate, propylene glycol monomethyl ether, propylene glycol monoethyl ether, propylene glycol monopropyl ether, propylene glycol monomethyl ether acetate, ethyl lactate, methyl methoxypropionate, cyclopentanone, cyclohexanone, butyl acetate, γ-butyrolactone, isoamyl acetate, chloroform, dichloromethane, 1,4-dioxane, hexyl alcohol, 2-heptanone, isoamyl acetate, and tetrahydrofuran.

In certain embodiments of the present disclosure, the chemical liquid is a pre-wetting liquid. The type of pre-wetting liquid is not particularly limited. Specific examples of a pre-wetting liquid include at least one of cyclopentanone (CyPe), cyclohexanone (CyH), propylene glycol monomethyl ether (PGME), propylene glycol monoethyl ether (PGEE), propylene glycol monomethyl ether acetate (PGMEA), propylene glycol monopropyl ether (PGPE), ethyl lactate (EL). In other embodiments, the chemical liquid may be a developer solution such as butyl acetate, or a rinsing liquid such as 4-methyl-2-pentanol (MIBC).

<Impurities>

Impurities contained in a processing target and/or a chemical liquid include metallic impurities, particles, and others such as organic impurities, moisture, etc.

<Metallic Impurities>

The most common metallic impurities include heavy metals such as iron (Fe), aluminum (Al), chromium (Cr), nickel (Ni) and ionic metals such as sodium (Na) and calcium (Ca). Depending on the type of metal, metal impurities deteriorate oxide integrity, degrade MOS gate stacks, reduce lifetime of devices, etc. In a chemical liquid prepared by the chemical liquid manufacturing apparatus of the present disclosure, the total trace metal content is preferred to be within a predetermined range of 0 to 150 ppt in mass.

In this disclosure, metal impurities refer to metal impurities that are provided in a form of a solid (metal simplex, particulate metal-containing compound, and the like).

In this disclosure, the total trace metal in a chemical liquid is measured by inductively coupled plasma mass spectrometry (ICP-MS) using a Fujifilm developed method. The OWMP (on-wafer metal particle) is determined by inspecting the wafer with a combination of a laser-based inspection system and an EDX (energy dispersive x-ray) inspection. The measurement methods of the total trace metal using ICP-MS and the on-wafer metal particle (OWMP) using laser and EDX are as described in the examples below.

<Particles>

In the present disclosure, the counting targets which have a size of 0.03 μm or greater are referred to as "particles". The number of "particles" in a liquid medium are to be countered by a light scattering type in-liquid particle counter and is referred as LPC (liquid particle count).

Examples of particles include dust, dirt, organic solid matters, and inorganic solid matters. The particles also may include impurities of colloidalized metal atoms. The type of the metal atoms that are easily colloidalized is not particularly limited, and may include at least one metal atom selected from the group consisting of Na, K, Ca, Fe, Cu, Mg, Mn, Li, Al, Cr, Ni, Zn, and Pb. In a chemical liquid prepared by the chemical liquid manufacturing apparatus of the present disclosure, the total content of the particles having a size of 0.03 μm or more is preferred to be within a predetermined range of 100 or less per 1 ml of the chemical liquid.

<Organic Impurities>

Organic impurities mean a compound which is different from the organic solvent as the main component provided in the chemical liquid and refer to organic matter which is contained in the content of 5000 mass ppm or smaller with respect to the total mass of the chemical liquid corresponds to the organic impurities and does not correspond to the organic solvent.

Volatile organic compounds are present in ambient air even inside a clean-room. Some of the organic impurities originate from the shipping and storage equipment, while some are presented in a raw material from the start. Other examples of organic impurities include a by-product generated when the organic solvent is synthesized and/or an unreacted reactant.

The total content of the organic impurities in the chemical liquid is not particularly limited. From a point of improving the manufacturing yield of a semiconductor device, the total content of the organic impurities is preferably 0.1 to 5000 mass ppm, more preferably 1 to 2000 mass ppm, further preferably 1 to 1000 mass ppm, particularly preferably 1 to 500 mass ppm, and most preferably 1 to 100 mass ppm, with respect to the total mass of the chemical liquid.

The content of the organic impurities in the chemical liquid can be measured by using a gas chromatography mass spectrometry (GCMS) device.

In the following, the embodiments of the present disclosure describe an exemplary chemical liquid manufacturing apparatus and an exemplary manufacturing method of a chemical liquid using the same. The chemical liquid manufacturing apparatus comprises at least a plurality of material treatment systems such that the number of unwanted particulates (particles) and the amount of metallic impurities in the chemical liquid prepared using the chemical liquid manufacturing apparatus are limited within predetermined ranges. Hence, the occurrence of residue and/or particle defects is suppressed and the yield of semiconductor wafer is improved.

<Chemical Liquid Manufacturing Apparatus>

Figure 1:
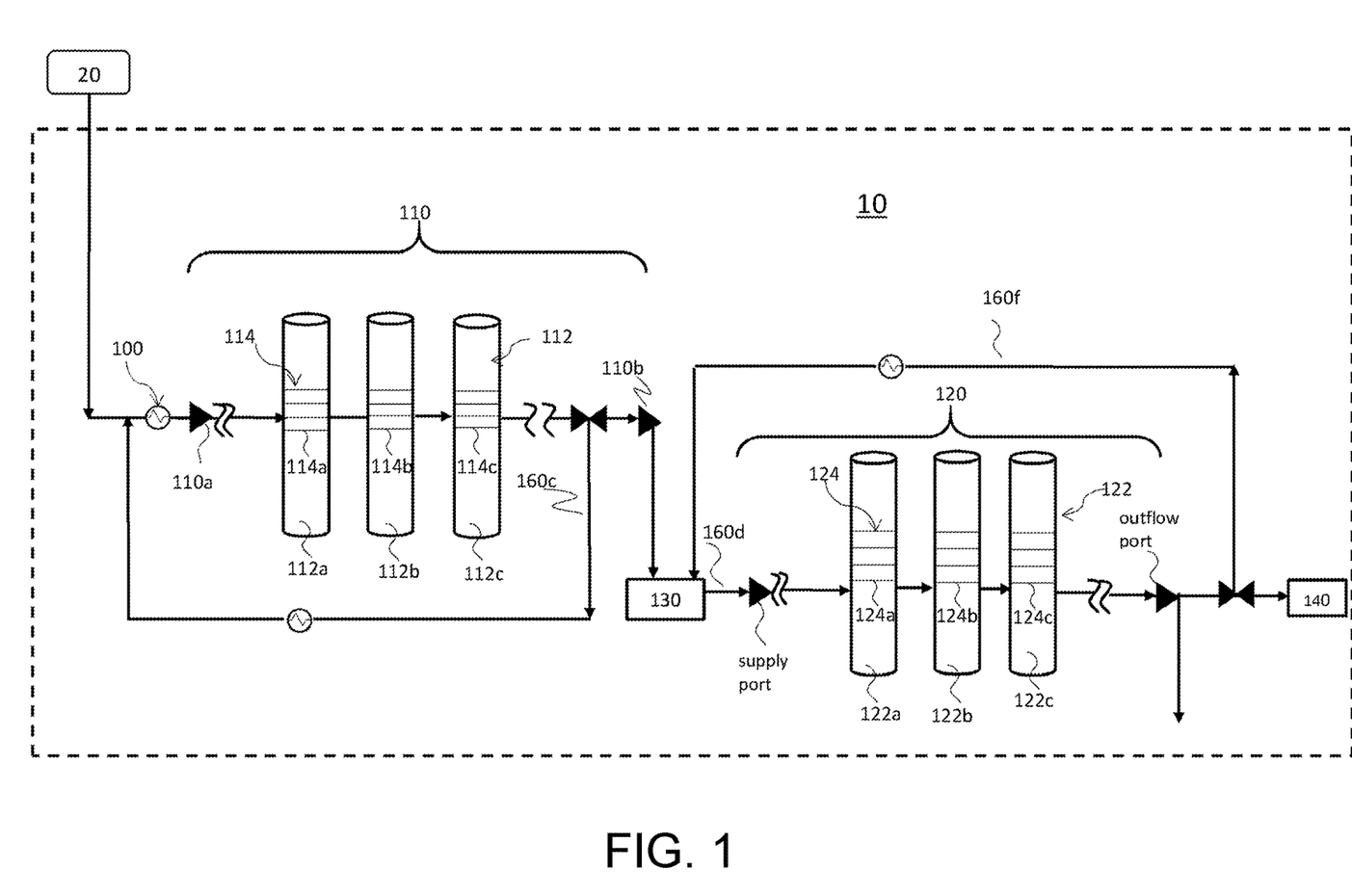
FIG. 1 is a schematic diagram showing a configuration of an exemplary chemical liquid manufacturing apparatus adopted in a method of manufacturing a chemical liquid in accordance with some embodiments of the present disclosure.

FIG. 1 is a schematic diagram showing a configuration of an exemplary chemical liquid manufacturing apparatus according to some embodiments of the present disclosure. As shown in FIG. 1, the chemical liquid manufacturing apparatus 10 is connected to a processing target supply unit 20 configured to hold or transport a material, for example, a processing target material or a pre-processed chemical liquid, to be processed by the chemical liquid manufacturing apparatus 10. The processing target supply unit 20 is not particularly limited as long as it continuously or intermittently supplies the processing target material to the chemical liquid manufacturing apparatus 10. The processing target supply unit 20 may include a material receiving tank, a sensor such as a level gauge (not shown), a pump (not shown), a valve for controlling the flow of the processing target material (not shown), etc. In FIG. 1, the chemical liquid manufacturing apparatus 10 is connected to one processing target supply unit 20. However, the present disclosure is not limited as such. In some exemplary embodiments, a plurality of processing target supply units 20 is provided in parallel for each type of processing target materials to be processed by the chemical liquid manufacturing apparatus 10.

The processing target material may include a raw material used in the preparation of, for example, a processing liquid applied in semiconductor manufacturing, such as a pre-wetting liquid, a developer solution, a rinsing liquid, a cleaning solution, a stripping solution and the like. In the following description, unless otherwise noted, the term "preparation" of a specific material is used to mean that a specific material or a chemical liquid as in most embodiments of this disclosure is produced by, for example, purifying, reacting, or mixing of the processing target material. The processing target material may be synthesized in house or commercially available via purchasing from a supplier.

In certain embodiments of the present disclosure, the processing target material is a raw organic solvent used in the preparation of a pre-wetting liquid. For example, the raw organic solvent is processed by the chemical liquid manufacturing apparatus 10 to form an ultra-pure pre-wetting liquid, for example, high purity grade methanol, ethanol, 1-propanol, isopropanol, monomethyl ether, propylene glycol monomethyl ether, propylene glycol monoethyl ether, propylene glycol monopropyl ether, propylene glycol monomethyl ether acetate, ethyl lactate, methyl methoxypropionate, cyclopentanone, cyclohexanone, γ-butyrolactone, diisoamyl ether, butyl acetate, 4-methyl-2-pentanol, and a combination thereof.

As shown in FIG. 1, the chemical liquid manufacturing apparatus 10 includes at least a first material treatment system 110. In certain exemplary embodiments, the chemical liquid manufacturing apparatus 10 may include a heat exchanger 100 for setting the temperature of the processing target material within a certain temperature range; as such, the processing target material charging into the chemical liquid manufacturing apparatus 10 is maintained at a substantially consistent temperature. The heat exchanger 100 is configured, for example, between the processing target supply unit 20 and the first material treatment system 110. It is noted that additional temperature controllers may be configured throughout the chemical liquid manufacturing apparatus 10 as necessary.

Still referring to FIG. 1, the first material treatment system 110 includes at least one or plural filtration media (solid horizontal lines designated by the reference numeral 114), each having a specific purification function and offering a specific treatment. For example, the first material treatment system 110 may include at least one filtration medium 114 (114a, 114b or 114c) selected from an ion exchange membrane, an ion adsorption membrane. In other embodiments, the first material treatment system 110 includes an ion exchange membrane, an ion adsorption membrane, and a particle removal filter. It is noted that the above examples are for illustrative purposes, and the type of filtration medium is not limited to the shown examples.

In certain exemplary embodiments, the one or plural filtration media 114 may be compartmentalized and contained in one or plural housings 112, respectively. For example, the first material treatment system 110 may include at least one housing 112 selected from a first housing 112a, a second housing 112b and a third housing 112c, and the at least one housing 112 includes and accommodates one or plural units of filtration medium 114 therein. It is noted that the above examples are for illustrative purposes. In other exemplary embodiments, the first material treatment system 110 may include more housings 112, for example, one, two, three, six, or ten more, in addition to above first, second and/or third housings (112a, 112b, 112c). In alternative exemplary embodiments, there may be no separate housings 112, and the one or plural filtration media 114 are configured un-compartmentalized in the first material treatment system 110. In yet other exemplary embodiments, the first material treatment system 110 also may include other material treatment modules (not shown) in addition to the one or plural filtration media 114. Further, the one or plural units of filtration medium 114 accommodated in the housing 112 may be configured in series, parallel, or a combination of both.

According to the exemplary embodiments as illustrated in FIG. 1, the first housing 112a may include one or plural units of the first filtration medium 114a, the second housing 112b may include one or plural units of the second filtration medium 114b, the third housing 112c may include one or plural units of the third filtration medium 114c, wherein the first, second, and third filtration media 114a, 114b and 114c may be different in functionality or property, and offer different purification treatments, while the one or more units of the filtration medium 114 (114a, 114b, 114c) accommodated in each of the selected housings 112 (112a, 112b, 112c), respectively, have the same or similar purification function, physiochemical properties, pore size and/or construction material, etc. For example, certain filtration medium has pure sieving characteristics (e.g. coarse particle removal filters), while other filtration medium has non-sieving characteristics (e.g. ion exchange membranes that mainly serve to remove ionic species) or an integration of sieving and non-sieving characteristics, such as an ion adsorption membrane. An ion adsorption membrane comprises a porous membrane material and an ion exchange function. Such ion adsorption membrane in accordance to the exemplary embodiments of the present disclosure is not particularly limited as long as it has a pore diameter of 100 μm or less and has an ion exchange function. In some embodiments, the ion adsorption membrane has a pore diameter of 100 μm or less and 20 nm or more. In certain embodiments, the ion adsorption membrane has a pore diameter of 10 nm or less.

Also, in some embodiments of the present disclosure, the first material treatment system 110 includes at least a combination of a filtration medium having the non-sieving characteristics and a filtration medium having the integrated characteristics (both sieving and non-sieving). For examples, the first material treatment system 110 at least includes one or more units of ion exchange membrane and one or more units of ion adsorption membrane. In other examples, the first material treatment system 110 at least includes one or more units of ion exchange membrane, one or more units of ion adsorption membrane, and one or more units of particle removal filter. Further, in certain exemplary embodiments, at least one unit of the ion exchange membrane is positioned at the downstream side of the one or more units of ion exchange membrane.

In accordance to some embodiments of the disclosure, certain filtration medium comprising the sieving characteristics is formed or constituted with a resin material having an amide bond or an imide bond. In some examples, the certain filtration medium comprising the sieving characteristics is formed or constituted with a nylon material, a polyimide material or a polyamide-imide material. For examples, the first material treatment system 110 may include one or units of plural particle removal filter, one or plural units of ion exchange membrane, and one or plural units of ion adsorption membrane, respectively, accommodated in the first housing 112a, the second housing 112b, and the third housing 112c, wherein the one or plural units of particle removal filter and/or the one or plural units of ion adsorption membrane may form with a nylon material or a polyimide material. In other examples, the first material treatment system 110 may include one or plural units of ion exchange membrane and one or plural units of ion adsorption membrane, respectively, accommodated in the first housing 112a and the second housings 112b, and the one or plural units of ion exchange membrane is constituted with a nylon material or a polyimide material. It is noted that the above examples are for illustrative purposes and are not intended to be limiting.

In accordance to some embodiments of the present disclosure, the first material treatment system 110 includes one or plural units of filtration medium that is constituted with a nylon material or a polyimide material is configured at a downstream side of the one or plural units of the filtration medium having the non-sieving characteristics. For example, the first material treatment system 110 houses, in sequence and downstream of its supply port 110a, the first housing 112a, the second housing 112b and the third housing 112c for accommodating one or plural units of ion exchange membrane and one or plural units of ion adsorption membrane, and the one or plural units of ion adsorption membrane are formed with a resin material, for example, nylon or polyimide. In this respect, as shown in FIG. 1, the one or plural units of ion exchange membrane may be housed in the first housing 112a, and the one or plural units of the ion adsorption membrane may be housed in the second housing 112b or the third housing 112c so that the processing target material is to be processed by the exchange membrane(s) in the first housing 112a prior to being processed by the ion adsorption membrane(s) disposed in either the second housing 112b or the third housing 112c configured at the downstream side of the first housing 112a. It is noted that the above examples are for illustrative purposes, and the positions and the sequences of the one or plural units of the filtration medium (114a, 114b and/or 114c) are not limited to the shown examples. In other exemplary embodiments, the one or plural units of the filtration medium formed with a nylon material or a polyimide material also may be configured at an upstream side of the one or plural units of the filtration having non-sieving characteristics, such as an ion exchange membrane.

As described hereinbefore, there may be no separate housings 112 in the first material treatment system 110, and the one or plural filtration media 114 are configured un-compartmentalized and are concatenated together inside the first material treatment system 110, and the processing target material is caused to cascade through the filtration media 114 (114a, 114b, 114c). In this regard, for example, the first material treatment system 100 houses, in sequence and downstream of its supply port 110a, one or plural particle removal filters A, one or plural ion exchange membranes A, one or plural ion adsorption membranes A, and one or plural ion adsorption membranes B, wherein at least the one or plural ion adsorption membranes A and/or the one or plural ion adsorption membranes B are formed with a nylon material. Further, the one or plural ion adsorption membranes A and the one or plural ion adsorption membrane B may have different pore diameters, for example, 20 nm and 5 nm, respectively. As such, the processing target material is caused to cascade through in accordance to the sequence of the filtration media 114 (114a, 114b, 114c) configured in the first material treatment system 110. It should be appreciated that the arrangement sequences of the filtration media and flow sequences of the processing target material as exemplified above are for illustrative purposes and are not intended to be limiting.

As disclosed above, the first material treatment system 110 also may include other material treatment modules in addition to the one or plural filtration media 114. However, it is noted that, according to the exemplary embodiments of the present disclosure, the chemical liquid manufacturing apparatus 10 does not include ultrafiltration membranes (UF filter) and reverse osmosis membranes (RO filter) as typically applied in aqueous solvents.

In certain embodiments, the first material treatment system 110 is configured for an in-line single pass, wherein the processing target is processed by or passes through the first material treatment system 110 once, before being delivered to a next stage of processing 140. However, the present disclosure is not limited as such. In alternative embodiments, the first material treatment system 110 may also be configured for a recirculation of plural passes. It is noted that the number of times the processing target to be processed by the first material treatment system 110 is not limited, as long as the processing by the first material treatment system 110 is completed before the processing target is discharged from the outflow port 110b of the first material treatment system 110 and delivered to the next stage of processing 140.

In accordance to the non-limiting embodiments as described above, the chemical liquid manufacturing apparatus 10 may further include a second material treatment system 120 communicating with the first material treatment system 110 either directly or indirectly, wherein the second material treatment system 120 may include one or plural filtration media 124 (124a, 124b, 124c). Similar to the first material treatment system 110, the one or plural filtration media 124 in the second material treatment system 120 may be compartmentalized and contained in one or plural housings 122 (122a, 122b, 122c), respectively, wherein the one or plural filtration media 124 (124a, 124b, 124c) accommodated in the various housings may be different in functionality or property, and offer different purification treatments, while the one or more units of the filtrations medium 124 (124a, 124b, 124c) accommodated in each of the selected housings 122 (122a, 122b, 122c), respectively, have the same or similar purification function, physiochemical properties, pore size and/or construction material, etc. For example, the second material treatment system 120 may include a filtration medium 124 (124a, 124b, 124c) selected from a particle removal filter, an ion exchange membrane, and an adsorption membrane. In other exemplary embodiments, there may be no separate housings 122, and the one or plural filtration media 124 are configured un-compartmentalized in the second material treatment system 120. In yet other exemplary embodiments, the second material treatment system 120 also may include additional unillustrated housing in addition to the one or plural housings 122 and/or other unillustrated material treatment modules in addition to the one or plural filtration media 124. It should be noted that the number of units of the filtration medium 114, 124 and the number of housings 112, 122 shown and discussed are representative and kept at a low number for the sake of simplicity in both the drawings and description. Further, the second material treatment system 120 may be adopted for a single pass or a continuous recirculation of plural times.

In accordance to some exemplary embodiments of the disclosure, the filtration medium 124 comprising the sieving characteristics is formed or constituted with a resin material having an amide bond, an imide bond, or a combination of an amide bond and an imide bond. For example, the second material treatment system 120 may include one or plural units of ion adsorption membrane 124 formed with or constituting a nylon material or a polyimide material. Further, the one or plural units of ion adsorption membrane 124 may have a pore diameter of 100 μm or less. In some embodiments, the one or plural units of ion adsorption membrane 124 has a pore diameter of 100 μm or less and 20 nm or more; in alternative embodiments, the pore diameter of ion adsorption membrane 124 is 10 nm or less. Further, in certain exemplary embodiments, the one or plural units of ion adsorption membrane 124 is configured at a downstream side of one or plural units of the filtration medium having the non-sieving characteristics, for example, an ion exchange membrane configured in either the first material treatment system 110 or the second material treatment system 120.

In the exemplary embodiments as shown in FIG. 1, the second material treatment system 120 is configured downstream of the first material treatment system 110; however, it is noted that the relative configurations of the first material treatment system 110 and the second material treatment system 120 are not limited to the shown examples above. Further, according to some embodiments of the disclosure, the first material treatment system 110 and the second material treatment system 120 may be connected directly or indirectly via an intermediate unit 130, for example, a collection tank or other material treatment apparatus, wherein the intermediate unit 130 and the first material treatment system 110 are connected via a transfer conduit 160c, while the intermediate unit 130 and the second material treatment system 120 are connected via a transfer conduit 160d and a recirculating conduit 160f. It is understood that pumps and valves are installed at the various conduits, outflow ports and supply ports at the processing target supply unit 20, the first material treatment system 110, the second material treatment system 120, the intermediate unit 130, etc. as necessary. Further, the operations of first material treatment system 110 and the second material treatment system 120 may be controlled by a CPU (central processing unit), for example, a computer system.

<Method of Manufacturing a Chemical Liquid>

Figure 2:
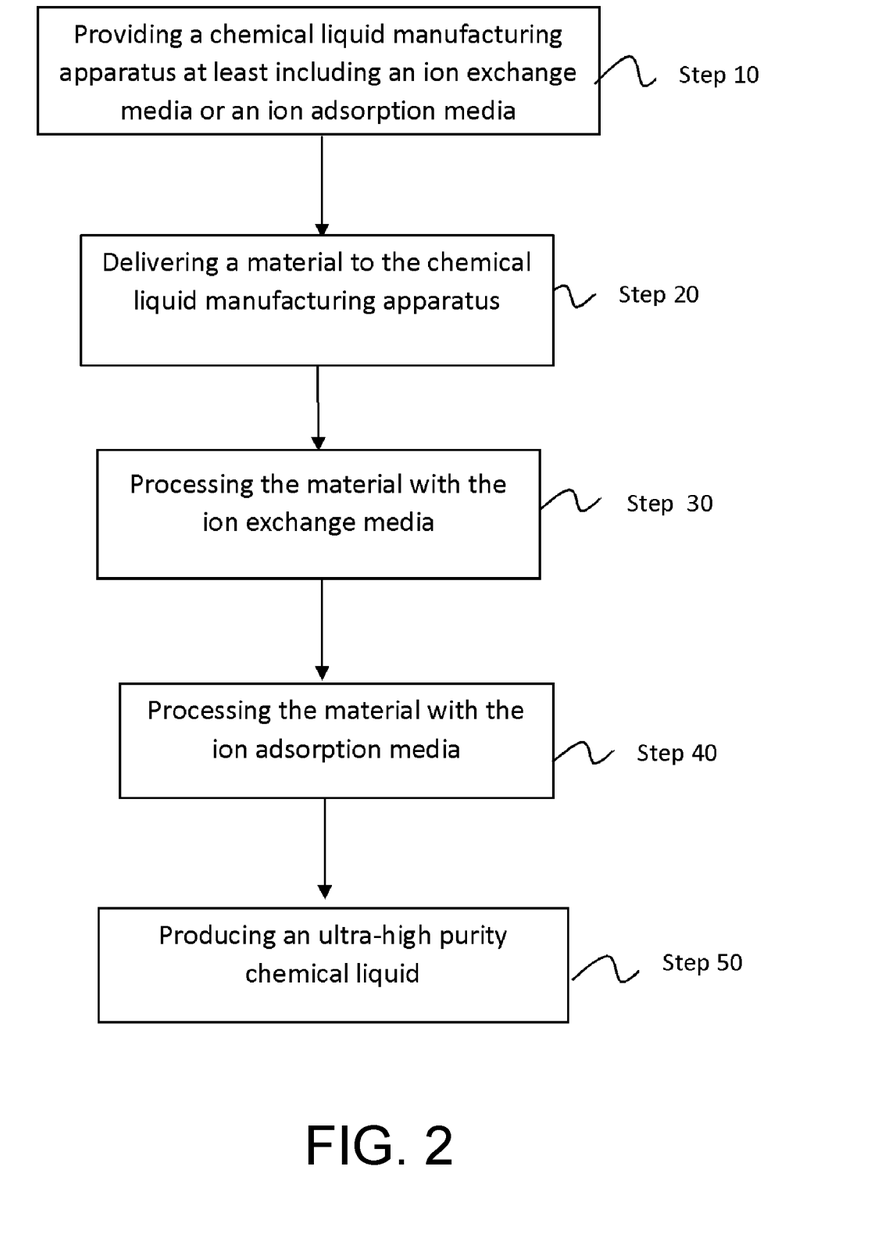
FIG. 2 is a flow chart of process steps in an exemplary manufacturing method of a chemical liquid in accordance with some embodiments of the present disclosure.

FIG. 2 is a flow chart of process steps in an exemplary manufacturing method of a chemical liquid in accordance with some embodiments of the present disclosure.

Referring to both FIGS. 1 and 2, a manufacturing method of a chemical liquid, according to some embodiments, includes providing a chemical liquid manufacturing apparatus 10 in Step 10 for the manufacturing of a chemical liquid.

In accordance to the exemplary embodiments of the disclosure, the chemical liquid manufacturing apparatus 10 includes at least a first material treatment system 110 housing one or plural first filtration media 114, wherein the first filtration media 114 includes at least one or plural units of ion exchange membrane and one or plural units of ion adsorption membrane. In other embodiments, the first filtration media 114 may include also one or plural units of particle removal filter in addition to the at least one or plural units of ion exchange membrane and one or plural units of ion adsorption membrane. In certain exemplary embodiments, the chemical liquid manufacturing apparatus 10 comprises a second material treatment system 120 in addition to the at least first material treatment system 110.

Referring next to Step 20, a pre-processed chemical liquid or a processing target material is delivered to the first material treatment system 110 of the chemical liquid manufacturing apparatus 10. The processing target material may include an organic solvent as described in [0032] above. In some exemplary embodiments, the organic solvent includes at least one of methanol, ethanol, 1-propanol, isopropanol, monomethyl ether, propylene glycol monoethyl ether, propylene glycol monomethyl ether, propylene glycol monopropyl ether, propylene glycol monomethyl ether acetate, ethyl lactate, methyl methoxypropionate, cyclopentanone, cyclohexanone, γ-butyrolactone, diisoamyl ether, butyl acetate, 4-methyl-2-pentanol, and a combination thereof. Further, the content of a metal component in the pre-processed chemical liquid ranges from about 0.1 to 1000 mass ppt. In some embodiments, the metal component includes, but is not limited to, aluminum (Al), calcium (Ca), chromium (Cr), copper (Cu), iron (Fe), potassium (K), magnesium (Mg), manganese (Mn), sodium (Na), nickel (Ni), tin (Sn), titanium (Ti) and/or zinc (Zn).

Still referring FIGS. 1 and 2, the method of manufacturing a chemical liquid includes processing the processing target material with the one or plural units of ion exchange membrane in Step 30. Thereafter, continuing to Step 40, the processing target material is processed by the one or plural units of ion adsorption membrane. In accordance to some embodiments of the present disclosure, the processing target material is processed by the one or plural units of ion exchange membrane first, and subsequently by the one or plural units of ion adsorption membrane. It should be noted that the above-mentioned processing sequence is merely for illustration, which construes no limitation to the present disclosure. In certain embodiments, the one or plural units of ion adsorption membrane is formed with a resin material containing an amide bond, an imide bond, or a combination of an imide and amide bond. For example, the one or plural units of ion adsorption membrane may form with a nylon material, a polyimide resin material or a polyamide-imide material. Further, the pore diameter of the ion adsorption membrane is less than 100 nm, for example, greater than 20 nm and less than 100 nm. In alternative embodiments, the pore diameter of the ion adsorption membrane is or less than 10 nm.

The method of manufacturing a chemical liquid may include optionally recirculating the processing target through and be processed by the first material treatment system 110 again. The method also may include delivering the processing target to the second material treatment system 120 to be processed by the one or plural second filtration media 124 in the second material treatment system 120 for one or plural times, wherein the one or plural second filtration media 124 may include one or plural units of ion adsorption membrane. Further, in certain examples, the one or plural units of ion adsorption membrane may be formed with a resin material comprising an amide bond or imide bond, such as a nylon material or a polyimide material. It should be noted that the above examples are for illustrative purposes, which construe no limitation to the present disclosure.

As soon as the number of particles and the amount of metallic impurities, collected and detected from the processed chemical liquid at the end of the processing by the first material treatment system 110 or a combination of the first and the second material treatment system 120, are controlled within the predetermined ranges, an ultra-high purity chemical liquid is produced in Step 50. Subsequently, the ultra-high purity chemical liquid is transferred to either a next stage of manufacturing or to packaging 140.

[Particle Removal Filter]

The particle removing process is a process of removing particles and/or metal impurities (metal impurities in a solid form) in a processing target, such as a chemical liquid, by using a particle removal filter. The particle removal filter is not particularly limited, and well-known particle removal filters can be used.

Although the average pore size (pore diameter) of the filter is not particularly limited, it is suitably about 0.001 to 1.0 μm (1 nm to 1000 nm), preferably about 0.003 to 0.5 μm (3 nm to 500 nm), and more preferably about 0.005 to 0.1 μm (5 nm to 100 nm). Within this range, it is possible to reliably remove foreign matters such as impurities or aggregates contained in the refined product while suppressing clogging of the filter. In certain embodiments of the disclosure, the first material treatment system 110 may include a particle removal filter having an average pore size as small as 2 nm (for example, microfiltration membrane having a pore size of 2 nm or greater), and may range from 0.002 μm (2 nm) or more to about 1.0 μm (1000 nm) or less. In a case where fine particles are provided in the processing target in addition to colloidalized impurities including metal atoms such as iron or aluminum, the processing target is filtered by using a filter having an average pore size as small as 50 nm to remove particles before filtering is performed by using a filter having average pore size as small as 20 nm or 15 nm to remove finer particles. Thus, the filtration efficiency is improved and performance of removing particles is more improved.

In some embodiments of the disclosure, the second material treatment system 122 may include a particle removal filter having a pore size as small as 0.001 µm (1 nm), and may range from about 0.001 µm (1 nm) or more to about 0.015 µm (15 nm) or less. In certain embodiments, the second material treatment system 120 may include a UPE filter having a pore size as small as 1 nm. Yet in other embodiments, the second material treatment system 120 may include a Nylon or a MPTFE filter having a pore size of about 5 nm. Here, the average pore size can refer to the nominal value of the filter manufacturer.

Examples of the material of the filter used in particle removal include a fluororesin such as polytetrafluoroethylene (PTFE), a polyamide resin such as nylon and the like, a polyolefin resin (including high density and ultrahigh molecular weight) such as polyethylene and polypropylene (PP) and the like, a perfluoroalkoxy (PFA) resin and the like, or a modified polytetrafluoroethylene (MPTFE). In view of efficiently removing fine foreign matters such as impurities and/or aggregates contained in a chemical liquid, the filter used in particle removal of the present disclosure is made of at least one selected from the group consisting of nylon, polypropylene (including high density polypropylene), polyethylene, polytetrafluoroethylene, tetrafluoroethylene-perfluoroalkyl vinyl ether copolymer, polyimide, and polyamdie imide. According to the filter made of the above material, it is possible to effectively remove foreign matter having high polarity which is likely to cause residue defects and/or particle defects, and it is possible to efficiently reduce the content of the metal component in the chemical liquid.

Polyimide and/or polyamide imide may have at least one selected from the group consisting of a carboxy group, a salt type carboxy group, and a —NH— bond. Regarding solvent resistance, a fluororesin, polyimide, and/or polyamide imide is excellent.

[Ion-Exchange Resin Membrane (Ion-Exchange Membrane)]

The ion-exchange resin membrane used in the present embodiment is not particularly limited, and filters including an ion-exchange resin comprising a suitable ion-exchange group immobilized to a resin membrane may be used. Examples of such ion-exchange resin membranes include strongly acidic cation-exchange resins comprising a cation-exchange group such as a sulfonic acid group chemically modified on the resin membrane, and examples thereof include cellulose, diatomaceous earth, nylon (a resin having an amide group), polyethylene, polypropylene, polystyrene, a resin having an imide group, a resin having an amide group and an imide group, a fluororesin, or a high-density polyethylene membrane and ion-exchange resin membranes with a particle-removing membrane that is a membrane having an integral structure of a particle-removing membrane and an ion-exchange resin membrane. Polyalkylene membranes with an ion-exchange group chemically modified thereon are preferred. Polyalkylenes include, for example, polyethylene and polypropylene, and polypropylene is preferred. Cation-exchange groups are preferred as the ion-exchange group. Ion-exchange resin membranes used in the present embodiment may be commercially available filters with metal ion removal functionality. These filters are elected based on the ion exchange efficiency and with an estimated pore size of the filters as small as about 0.2 µm (200 nm).

[Ion Adsorption Membrane]

The ion adsorption membrane has a porous membrane material and has an ion exchange function. Such ion adsorption membrane is not particularly limited as long as it has a pore diameter of 100 nm or less and has an ion exchange function. The material, the type and the like thereof are not particularly limited. Examples of the material of a base material constituting the ion adsorption membrane include, but are not limited to, cellulose, diatomaceous earth, film material of microfiltration membrane such as nylon (resin having amide group), polyethylene, polypropylene, polystyrene, resin having imide group, resin having amide group and imide group, fluororesin, or high density polyethylene resin, a membrane material having an ion exchange ability functional group introduced therein, or the like. Examples of the shape of the membrane material include a pleated type, a flat membrane type, a hollow fiber type, a porous body as described in JP-A No. 2003-112060 and the like. As the ion exchange group to be introduced into the membrane material, it is preferable to use a combination of at least two of the cation exchange group, the chelate exchange group, and the anion exchange group to optimize the elution and selectivity of the components to be removed. Since the ion adsorption membrane has porosity, it is also possible to remove a part of the fine particles. In certain embodiments of the disclosure, the ion adsorption membrane is, for example, a nylon membrane having a pore diameter as small as 0.02 µm (20 nm).

As for an ion exchange membrane, there are other media that can uniformly distribute granular filter aid and remove metallic ion impurities from the solution by electrostatically adsorbing metal ion impurities to such particulate filter aid.

The medium comprises a self-supporting fibrous matrix, and the fiber matrix can comprise a particulate filter aid immobilized therein, optionally a binder resin. Furthermore, it is preferable that the particulate filter aid and optionally binder resin are uniformly distributed in the matrix cross section.

There are various kinds of granular filter aid contained in the above medium, for example, diatomaceous earth, magnesia, pearlite, talc, colloidal silica, polymeric granules such as those produced by emulsion polymerization or suspension polymerization, polystyrene, polyacrylate, polyvinyl acetate, polyethylene, activated carbon, clay and the like. Suitable self-supporting fibrous matrices for using the above media include, for example, polyacrylonitrile fibers, nylon fibers, rayon fibers, polyvinyl chloride fibers, cellulose fibers such as wood pulp and cotton, cellulose acetate fibers, and the like.

Preferably, the self-supporting matrix is a matrix of cellulosic fibers. The cellulose fibers are preferably unbleached cellulose pulp having a Canadian standard freeness of about +400 to about +800 ml as disclosed in U.S. Pat. No. 4,606,824 and a Canadian standard form of about +100 to about −600 ml. It is derived from a cellulose pulp mixture containing highly beaten cellulose pulp having freeness.

The above-mentioned medium is not particularly limited; for example, CUNO™ or Zeta Plus™ EC filter cartridge commercially available from Sumitomo 3M Company can be obtained as GN grade.

<Filter Containing Polyimide Resin>

The filter may be a porous film containing a polyimide resin as a material component. In the present disclosure, "polyimide resin" means polyimide and polyamideimide. A filter containing a polyimide resin of the present disclosure includes a filter containing at least one selected from the group consisting of polyimide and polyamide-imide as a material component.

The polyimide-based resin may have at least one functional group selected from the group consisting of a carboxy group, a salt-type carboxy group, and an —NH— bond. The filter is a porous film containing a polyimide resin as a material component and the filter may be a porous film made of a polyimide resin or a porous film containing a material component other than the polyimide resin.

When a filter contains a material component other than the polyimide-based resin, it is typical that a layer containing a polyimide-based resin and a layer containing another material (for example, nylon, polytetrafluoroethylene, and tetrafluoroethylene/perfluoroalkyl A vinyl ether copolymer and the like) is contained in the porous film.

The filter is a porous membrane and has a large number of pores in the membrane. The structure of the pores (pore structure) is not particularly limited, but it is preferable to have a communicating hole formed by communicating a large number of spherical holes. Further, in the filter, it is preferable that a flow path of the liquid to be purified is formed by the communication hole or the like.

Filter containing polyimide resin is not particularly limited, and may include the polyimide resin membranes as described in US2016/0256836. For example, the porous polyamide-imide resin filters may include membranes having a formulation of 79/8/13 weight % of NMP (N-methyl-2-pyrrolidone)/EG (ethylene glycol)/polyamide-imide), 75/12/13 weight % of NMP/EG/polyamide-imide, or 67/20/13 weight % of NMP/TEG (tri-ethylene glycol)/polyamide-imide.

Examples

The present disclosure will be more specifically described below based on the following examples. A material, a use amount, a ratio, treatment details, treatment procedures, and the like which will be described the following examples can be appropriately changed in a range without departing from the gist of the present invention. Accordingly, the range of the present disclosure should not be interpreted restrictively by the following examples.

<Preparation of Chemical Liquids>

The chemical liquid in the samples was cyclohexanone and was prepared by subjecting a pre-processed cyclohexanone (processing target material) to the chemical liquid manufacturing method executed by the chemical liquid manufacturing apparatus 10 of the present disclosure.

The arrangement and the selection of the filtration medium 114 and/or 124 in the first material treatment system 110 and/or the second material treatment system 120, such as the functionality, the pore size, the construction material of the filtration medium (114, 124), were adjusted to prepare a chemical liquid having a composition in each of the examples. In the following examples, the processing target material was processed or treated by at least one or plural units of particle removal filter, one or plural units of ion exchange membrane, and/or one or plural units of ion adsorption membrane.

<Preparation of a Filtration Medium A Comprising an Imide Resin>

With reference to the description in US2016/0256836, a filter A, which was a porous film containing a polyimide resin, was produced. The porous polyamide-imide filter A was produced having a formulation of 75/12/13 weight % of NMP (N-methyl-2-pyrrolidone)/EG (ethylene glycol)/Poly-amide-imide), which was similar to "Example 2d" as described in Table 1 of the US2016/0256836. The imidization rate of filter A was 1.45, and the resulting filter A had a pore size of 3 nm.

<Preparation of a Filtration Medium B Comprising an Imide Resin>

A porous film containing a polyimide resin having different imidization ratios was prepared with reference to the description of [0134] to [0149] of US Pat. No. 2018/0028983. Specifically, by adjusting the particle diameter and the like of the fine particles to be used, the pore size was controlled, and the treatment temperature, the treatment time, the pH in the chemical etching step, the calcination temperature and/or the reburning temperature and the like were adjusted. The rate of imidization was controlled. The imidization rate of filter B was 1.48, and the resulting filter B had a pore size of 10 nm.

<OWPC>

Each sample was collected and then inserted into a wafer coating tool. After a bare wafer was coated with a sample, the wafer was transferred to and inspected by a laser-based inspection system. By using a laser light, the laser-based inspection system detected, counted, recorded the location and sizes each particle on the wafer, at a detection limit of 19 nm. In these examples, counting targets included particles having a size of 31 nm or greater. The data was used to create wafer maps and provide the total on-wafer particle counts (OWPC), which included all particles having a size of ranging from 31 nm to 1000 nm.

<OWMP or OWMN>

The wafer was then transferred to be inspected by EDX (energy dispersive x-ray). Each particle reported by the laser-based inspection system was inspected by EDX (energy dispersive x-ray) for providing the elemental information. Any particle, which was found to produce any metal signal, was counted as a metal particle. The total number of particles with a metal signature was totalized to report as OWMP (on-wafer metal particle) or OWMN (on-wafer metal count).

<Trace Metal (ppb)>

Each chemical liquid sample was tested using ICP-MS (inductively coupled plasma mass spectrometry (ICP-MS). Using a Fujifilm developed method, each sample was tested for the presence of 26 metal species, the detection limit was metal specific, but the typical detection limits were in the range of 0.00010-0.030 ppb.

<Evaluation Results>

The effects of ion exchange (IEX) in combination of various configurations of ion adsorption (IAD) were examined, and the results were summarized in Table 1 below. More particularly, the effects of IEX without IAD or with IAD constructed with nylon and in different pore diameters on OWMN and on-wafer iron count were examined. According to the studies in Table 1, a processing target material (a pre-processed cyclohexanone) in samples 1 to 4 was processed first by at least a particle removal filtering treatment, for example, using 200 um polypropylene membrane or smaller. After the particle removal filtering treatment, samples 2, 3 and 4 were subsequently treated by ion exchange (IEX). After the IEX treatment, the processing target material in samples 3 and 4, respectively, was further subjected to an IAD treatment, wherein sample 3 was treated with an ion absorption membrane formed with a nylon material and having a pore diameter of 20 nm or greater, while sample 4 was treated with an ion absorption membrane formed with a nylon material and having a pore diameter of 20 nm or greater and also an ion adsorption membrane formed with a nylon material and having a pore diameter of 5 nm or greater. According to the results in Table 1, the chemical liquid manufacturing apparatus and the chemical liquid manufacturing method of the present disclosure were shown to have achieved the desired advantages of enhancing the removal of ionic impurities. The data indicated that combining an ion adsorption treatment at the end of an IEX treatment provides the ability to further collect and trap charged metal species that were not removed at the upstream filters or contaminants that might be generated by the IEX.

TABLE 1

|  | Sample 1 Without IEX and IAD | Sample 2 With IEX Without IAD | Sample 3 With IEX & With 20 nm Nylon IAD | Sample 4 With IEX & With 20 nm and 5 nm Nylon IAD |
|---|---|---|---|---|
| OWMN (all) | 9400 | 300 | 72 | 30 |
| OWMN (Iron only) | 4400 | 97 | 15 | 6 |

The effects of IEX without IAD or with IAD constructed with nylon and in different pore diameters on trace metals were examined, and the results were summarized in Table 2 below. According to the studies in Table 2, the raw material was a pre-processed cyclohexanone, which had not been subjected to the processing by the chemical liquid manufacturing apparatus of the present disclosure. The pre-processed cyclohexanone was processed first by at least a particle removal filter which was designed as Process A. In this study, the particle removal filter used was 50 µm polypropylene membrane (0.2 PP). After the particle removal filtering treatment, the processing target material was either treated by IEX (Process B), IAD (Process B) or a combination of both IEX and IAD (Process B+C), wherein in the combination process (Process B+C), IAD was performed after IEX. Further, for the IAD, a porous nylon membrane having a pore diameter of 20 nm or greater was used in the study. The results as summarized in Table 2 demonstrated that adopting a combination of IEX and IAD, and a nylon material for the IAD are effective in significantly reducing the amounts of many trace metals.

TABLE 2

| Trace metals by ICP-MS | | | | |
|---|---|---|---|---|
| Analyte | Raw Material | Process (A + C) | Process (A + B + C) | Process (A + B) |
| Al | 0.205 | 0.34 | 0.021 | 0.034 |
| Ca | 0.535 | 0.58 | 0.042 | 0.044 |
| Cr | 0.249 | 0.03 | 0.004 | 0.022 |
| Cu | 0.044 | 0.12 | 0.002 | 0.002 |
| Fe | 1.757 | 0.49 | 0.018 | 0.107 |
| K | 0.118 | 0.28 | 0.005 | 0.012 |
| Mg | 0.076 | 0.1 | 0 | 0 |
| Mn | 0.03 | 0.01 | 0.001 | 0.005 |
| Na | 0.256 | 2.01 | 0.007 | 0.010 |
| Ni | 0.129 | 0.06 | 0.002 | 0.003 |
| Sn | 0.014 | 0.004 | N/A | 0 |
| Ti | 0.072 | N/A | 0.011 | N/A |
| Zn | 0.124 | 1.81 | 0.009 | 0.01 |

The impacts of controlling of the pressure drop across the nylon ion adsorption membranes were shown to be significant on OWPC and OWMN. As in the results summarized in Table 3 below, when the pressure drop was controlled within the range of 3 to 15 psig, the OWPC was less than 300 and the OWMN was less than 10. On the other hand, when the pressure drop was not controlled, for example, at above 15 psig to 25 psig, the OWPC was greater than 700 and the OWMN was greater than 30.

TABLE 3

| OWPC <31 with pressure drop control | <300 |
|---|---|
| OWPC <31 without pressure drop control | >700 |
| OWMN with pressure drop control | <10 |
| OWMN without pressure drop control | >30 |

The collective results as summarized in Tables 1 to 3 confirmed that the method of manufacturing a chemical liquid by adopting the chemical liquid manufacturing apparatus of the present application achieved the desirable advantages of improving all the test attributes which at least included significantly reducing the OWMN, OWMN (iron only), OWPC and trace metals. These data substantiated that the manufacturing method and the manufacturing apparatus of the present disclosure impede the introduction and enhance the removal of unwanted contaminants, which are stemmed from an ineffectively designed manufacturing apparatus and/or an improperly implemented method of manufacturing. Similar performances are observed when "filter A" and filter B are used instead of a nylon filter as an IAD. Similar impacts on OWPC, OWMC and trace metals are expected when the nylon filters were replaced with the cellulose-based, acid cleaned diatomaceous earth resin of the CUNO™ or Zeta Plus™ EC filter cartridge. However, the performances of the nylon filters are still superior compared to the Zeta Plus™ EC filter cartridge.

Accordingly, the manufacturing method and the manufacturing apparatus of the present disclosure offer the competitive advantages of producing ultra-high purity chemical liquids, including but is not limited to, methanol, ethanol, 1-propanol, isopropanol, monomethyl ether, propylene glycol monomethyl ether, propylene glycol monoethyl ether, propylene glycol monopropyl ether, propylene glycol monomethyl ether acetate, ethyl lactate, methyl methoxy-propionate, cyclopentanone, cyclohexanone, γ-butyrolactone, diisoamyl ether, butyl acetate, 4-methyl-2-pentanol, or a combination thereof. Further, better performance was observed when cyclohexanone, PGMEA, butyl acetate, propylene glycol monomethyl ether acetate, isopropanol was used, and even better performance was achieved when cyclohexanone was used. Ultimately, an incurrence of defects on circuit patterns and semiconductor devices is avoided, and the yield is improved.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A manufacturing method of a chemical liquid, comprising:
providing a system at least comprising, in sequence, one or plural ion exchange membranes, one or plural first ion adsorption membranes, and one or plural second ion adsorption membranes having a pore diameter smaller than a pore diameter of the one or plural first ion adsorption membranes;
delivering a material to the system;
processing the material with the one or plural ion exchange membranes; and
processing the material with the one or plural first ion adsorption membranes and then with the one or plural second ion adsorption membranes to produce the chemical liquid,
wherein the material is processed by the one or plural ion exchange membranes before being processed by the one or plural first ion adsorption membranes.

2. The manufacturing method of claim 1, wherein the one or plural ion adsorption membranes are formed with a resin having an amide bond or an imide bond.

3. The manufacturing method of claim 1, wherein the one or plural ion adsorption membranes are formed with a nylon material.

4. The manufacturing method of claim 1, wherein the system processes the material, which is selected from the group consisting of methanol, ethanol, 1-propanol, isopropanol, monomethyl ether, propylene glycol monomethyl ether, propylene glycol monoethyl ether, propylene glycol monopropyl ether, propylene glycol monomethyl ether acetate, ethyl lactate, methyl methoxypropionate, cyclopentanone, cyclohexanone, γ-butyrolactone, diisoamyl ether, butyl acetate, 4-methyl-2-pentanol, and a combination thereof.

5. The manufacturing method of claim 1, wherein the system processes the material containing a metal component and a content of the metal component is about 0.1 to 1000 mass ppt.

6. The manufacturing method of claim 1, wherein a pressure drop across each of the one or plural ion adsorption membranes is controlled to about 3 to 15 psig.

7. The manufacturing method of claim 1, wherein the system also comprises one or plural particle removal filters at upstream of the one or plural ion exchange membranes.

* * * * *